(12) United States Patent
Areddu et al.

(10) Patent No.: US 7,864,749 B2
(45) Date of Patent: Jan. 4, 2011

(54) METHOD FOR THE STATISTICAL ESTIMATION OF THE TRAFFIC DISPERSION IN TELECOMMUNICATION NETWORK

(75) Inventors: Marco Areddu, Turin (IT); Riccardo Arizio, Turin (IT); Claudio Claretto, Turin (IT); Luigi De Martino, Turin (IT); Gabriele Gentile, Turin (IT); Riccardo Russo, Turin (IT)

(73) Assignee: Telecom Italia S.p.A., Milan (IT)

( * ) Notice: Subject to any disclaimer, the term of this patent is extended or adjusted under 35 U.S.C. 154(b) by 775 days.

(21) Appl. No.: 10/566,993

(22) PCT Filed: Aug. 7, 2003

(86) PCT No.: PCT/EP03/08766

§ 371 (c)(1),
(2), (4) Date: Feb. 2, 2006

(87) PCT Pub. No.: WO2005/015828

PCT Pub. Date: Feb. 17, 2005

(65) Prior Publication Data

US 2006/0193331 A1 Aug. 31, 2006

(51) Int. Cl.
*H04L 12/28* (2006.01)
(52) U.S. Cl. ...................................... 370/351
(58) Field of Classification Search .............. 370/351, 370/357, 229, 230, 230.1; 379/111, 112.01, 379/112.06, 112.1
See application file for complete search history.

(56) References Cited

U.S. PATENT DOCUMENTS 5,359,649 A   10/1994   Rosu et al.

(Continued)

FOREIGN PATENT DOCUMENTS

WO   WO-02/071779   9/2002

(Continued)

OTHER PUBLICATIONS

"Traffic Measurement by Destination"; ITU-T, Series E: Overall Network Operation, Telephone Service, Service Operation and Human Factors; Quality of service, network management and traffic engineering—Traffic engineering—Measurement and recording of traffic; ITU-T Recommendation E.491, pp. i-iii, and 1-4, (1997).

(Continued)

*Primary Examiner*—Chi H Pham
*Assistant Examiner*—Fan Ng
(74) *Attorney, Agent, or Firm*—Finnegan, Henderson, Farabow, Garrett & Dunner, L.L.P.

(57) ABSTRACT

A method for evaluating traffic dispersion at an exchange in a communications network, the exchange being arranged for applying a set of routing rules in allotting to a plurality of links (i.e., circuit groups) incoming traffic directed toward a given destination. The method includes the steps of incrementally generating traffic quantums representative of the traffic; producing a distribution of the traffic quantums over the circuit groups according to the set of routing rules; the distribution thus obtained being statistically representative of the dispersion of the incoming traffic over the plurality of circuit groups at the exchange. The steps of incrementally generating traffic quantums representative of the traffic and producing a distribution of the traffic quantums are performed in the absence of interference with operation of the exchanges/nodes in the communications network.

22 Claims, 9 Drawing Sheets

U.S. PATENT DOCUMENTS

| | | | |
|---|---|---|---|
| 6,209,033 B1 | 3/2001 | Datta et al. | |
| 6,327,467 B1* | 12/2001 | Yang et al. | 455/423 |
| 6,574,669 B1 | 6/2003 | Weaver | |
| 6,873,600 B1* | 3/2005 | Duffield et al. | 370/252 |
| 7,266,122 B1* | 9/2007 | Hogg et al. | 370/395.41 |
| 7,356,584 B2* | 4/2008 | Yip | 709/224 |
| 2003/0214913 A1* | 11/2003 | Kan et al. | 370/252 |
| 2004/0037230 A1* | 2/2004 | Kroboth et al. | 370/252 |
| 2004/0042398 A1* | 3/2004 | Peleg et al. | 370/230 |
| 2004/0151123 A1* | 8/2004 | Lau et al. | 370/252 |
| 2007/0171834 A1* | 7/2007 | Sathyanarayana et al. | 370/241 |

FOREIGN PATENT DOCUMENTS

| | | |
|---|---|---|
| WO | WO-2004/019556 A1 | 3/2004 |

OTHER PUBLICATIONS

"Traffic Intensity Measurement Principles"; ITU-T, Series E: Overall Network Operation, Telephone Service, Service Operation and Human Factors; Quality of service, network management and traffic engineering—Traffic engineering—Measurement and recording of traffic; ITU-T Recommendation E.500, pp. i-iii, and 1-10, (1998).

"Traffic Measurement Requirements for Digital Telecommunication Exchanges"; ITU-T, Series E: Overall Network Operation, Telephone Service, Service Operation and Human Factors; Traffic engineering—Measurement and recording of traffic; ITU-T Recommendation E.502, pp. i-iii, and 1-25, (2001).

"Terms and Definitions of Traffic Engineering"; ITU-T, Telephone Network and ISDN. Quality of Service, Network Management and Traffic Engineering; ITU-T Recommendation E.600, pp. i-iii, and 1-16, (1993).

* cited by examiner

Fig_4

Fig_8

METHOD FOR THE STATISTICAL ESTIMATION OF THE TRAFFIC DISPERSION IN TELECOMMUNICATION NETWORK

CROSS REFERENCE TO RELATED APPLICATION

This application is a national phase application based on PCT/EP2003/008766, filed Aug. 7, 2003, the content of which is incorporated herein by reference.

FIELD OF THE INVENTION

The invention relates to techniques for evaluating traffic dispersion in telecommunication networks. The present invention was developed by paying specific attention to the possible preferred use in circuit switched telecommunication networks. As used herein, "circuit switched" is intended to cover at large the concept of switching implemented by establishing a physical link between a calling party (source) and a called party (destination) and, as such, also extends to e.g. mobile communications networks applying that switching concept.

DESCRIPTION OF THE RELATED ART

Measurements of traffic dispersion can essentially be organized in two forms:
- measuring the amounts of traffic flows towards each destination which make up the whole traffic carried by a circuit group;
- measuring the amounts of traffic flows towards a single destination carried by one or more circuit groups, depending on the routing rule applied.

Network exchange nodes usually generate traffic dispersion measurements. These measurements, however, typically suffer from some major limitations:
- the number of objects simultaneously measured (i.e. traffic flows) is usually limited due to system constraints and high processing capacity needs;
- in the presence of a high traffic level in the network, exchanges may stop non-priority processes to prevent system instability: consequently, traffic dispersion measurements may be discontinued by the system, and this occurs just when they would be most useful; and
- each exchange measures its own traffic dispersion, without the capability of producing measurements related to the traffic dispersion from a network point of view.

A number of Recommendations of the Telecommunication Standardization Sector of the International Telecommunication Union (ITU-T) are related to traffic engineering and measurement. Specifically, the following ITU-T documents provide definitions, principles and requirements for traffic measurements in a telecommunication network., e.g.:
- ITU-T Recommendation E.491—Traffic measurement by destination—(05/1997)
- ITU-T Recommendation E.500—Traffic intensity measurement principles—(11/1998)
- ITU-T Recommendation E.502—Traffic measurement requirements for digital telecommunication exchanges—(02/2001)
- ITU-T Recommendation E.600—Terms and definitions of traffic engineering—(03/1993)

More in detail:
Recommendation E.491 defines the destination concept and the associated traffic measurements;
Recommendation E.500 defines methods and principles used to generate, analyse and collect traffic measurements;
Recommendation E.502 defines requirements for digital telecommunication exchanges in terms of which and how traffic measurements should be made All the documents listed are related to traffic measurements effected with telecommunication exchanges.

In U.S. Pat. No. 5,359,649 a system is disclosed for optimising the traffic carrying capacity of a telecommunications network having a plurality of elements and a plurality of routes connecting those elements to one another. The controlled congestion in the network is controlled by identifying and limiting defective devices and routes with exaggerated levels of congestion. Disturbance alarm levels are also adjusted to allow increased traffic through the network. The traffic within the network is reconfigured in real time in response to the occurrence of network events to optimize traffic capacity.

OBJECTS AND SUMMARY OF THE INVENTION

The need is thus felt for arrangements that may provide, preferably at a centralised level, an evaluation of the dispersion of traffic within a network such as a circuit-switched network. The availability of such a tool is significant for telecommunication network operators in planning, designing, operating and managing such networks.

In fact, circuit-switched network are known to be exposed to overflow phenomena that i.a. render the basic models currently adopted for "traffic engineering" no longer applicable.

More to the point, the need exists for arrangements that may generate reliable indicators of traffic dispersion without involving network equipment (and thus generating undesired additional load in that equipment).

The object of the present invention is to satisfy such needs.

According to the present invention, that object is achieved by means of a method having the features set forth in the claims that follow. The present invention also related to corresponding system and network, as well as to a computer program product loadable in the memory of at least one computer and including software code portions for performing the method of the invention when the product is run on a computer.

A preferred embodiment of the invention is a system that acquires the following information from the exchange nodes of the telecommunication network:
- traffic measurement on destinations and circuit groups, which are available in most network conditions with very few limitations; and
- routing rules used by the exchange nodes to distribute traffic directed to each destination on the different circuit groups.

Such a system then generates a statistical estimation of the traffic dispersion starting from destination and circuit groups measurements, and the routing rules used by each destination to route traffic over the available circuit groups.

The foregoing provides for the statistical estimation of a set of measurements, some of which may not be available in an exchange; these measurements can however be obtained outside the network nodes starting from a subset of traffic measurement.

The main advantages of the arrangement considered are:
- no limitations apply to the number of destinations and circuit groups involved in the traffic dispersion evaluation: in fact, no appreciable processing capacity needed for this task is drawn from network exchanges;
- the system acquires information from all the exchange nodes in the network; this gives the possibility of generating traffic dispersion information on a network basis that is not currently available at exchange nodes.

The system disclosed herein generates a statistical estimation of the traffic dispersion since only the exchange itself is able to measure the traffic dispersion without uncertainty.

BRIEF DESCRIPTION OF THE DRAWINGS

The invention will now be described with reference to the annexed figures of drawing, wherein.

DETAILED DESCRIPTION OF PREFERRED EMBODIMENTS OF THE INVENTION

Figure 1:
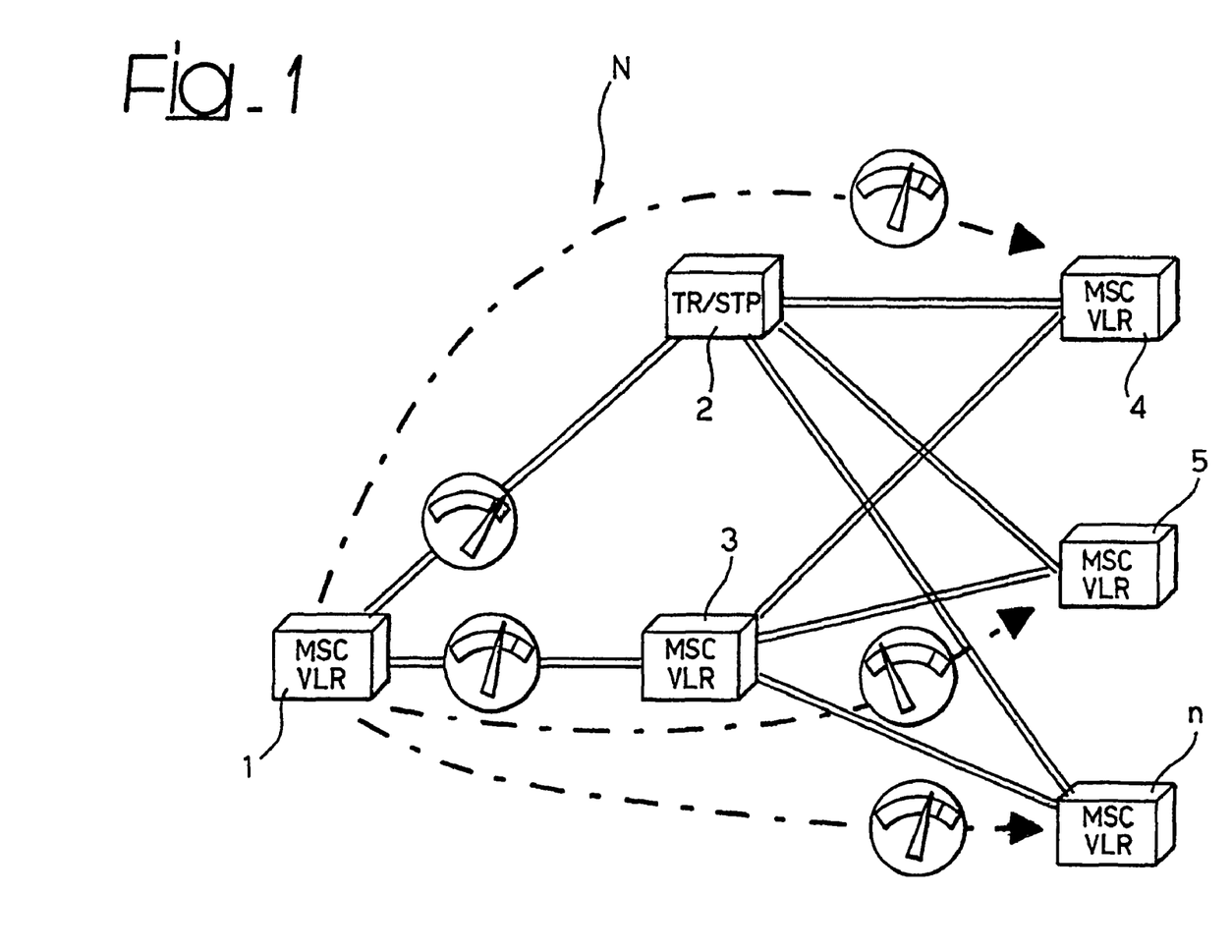
FIG. 1 is a basic block diagram of a telecommunication network.

FIG. 1 is a basic block diagram of a telecommunication network N including a plurality of nodes each equipped with a respective exchange 1, 2, 3, . . . , n.

Specifically, the exchanges in question network are configured (in manner largely known per se) in order to cause the network N to operate as a circuit switched telecommunication network.

As already indicated, "circuit switched" is intended to cover at large the concept of switching implemented by establishing a physical link between a calling party (source) and a called party (destination) and, as such, also extends to e.g. mobile communications networks applying that switching concept.

Exemplary of such a network is the "fixed" part of a mobile telecommunication network operating according to the GSM (Global System for Mobile communications) standard. In such a network the nodes/exchanges shown may be actually represented by MSC/VLR and/or TR/TSP modules. As is well known, these acronyms stand for Mobile Switching Center, Visitor Location Register, TRansit point and Signalling Transfer Point, respectively.

It will be appreciated that reference to this specific, possible context of application is in no way to be construed as limiting the scope of the invention.

In a network N as shown in FIG. 1, conventional measurements of traffic dispersion essentially provide for:

measuring the amounts of traffic flows towards each destination which make up the whole traffic carried by a "link" as represented e.g. by a circuit group (for example: the traffic flowing from node 1 to node 2, irrespective of whether this is eventually sent to any of nodes 4, 5, or n); and measuring the amounts of traffic flows towards a single destination carried by one or more circuit groups, depending on the routing rule applied (for example: the traffic from node 1 to node 4, irrespective of whether this is routed via node 2 or node 3).

The arrangement disclosed herein has the purpose of providing more analytical indications concerning the dispersion of traffic over the whole network. By referring to the examples just made, such more analytical indications may include e.g.:

an indication of the amounts of traffic from node 1 to node 4 that are routed via the node 2 and via the node 3, respectively, or an indication of what portions of the traffic flowing from node 1 to node 2 are possibly sent towards any of nodes 4, 5, or n.

In the arrangement disclosed herein, at least some of the nodes in the network N (in FIGS. 2 and 3, a generic node/exchange designated $EX_k$ is shown), are configured in order to permit extraction of the configuration data 10 (essentially, the routing rules) and—from the measurements already currently available at each exchange—the performance data 12 (essentially, the conventional measurement data mentioned in the foregoing).

The processing tasks related to generating the routing rules can be performed by resorting e.g. to the arrangement disclosed in WO-A-02/071779 and in Italian patent application TO20002A000742.

Figure 2:
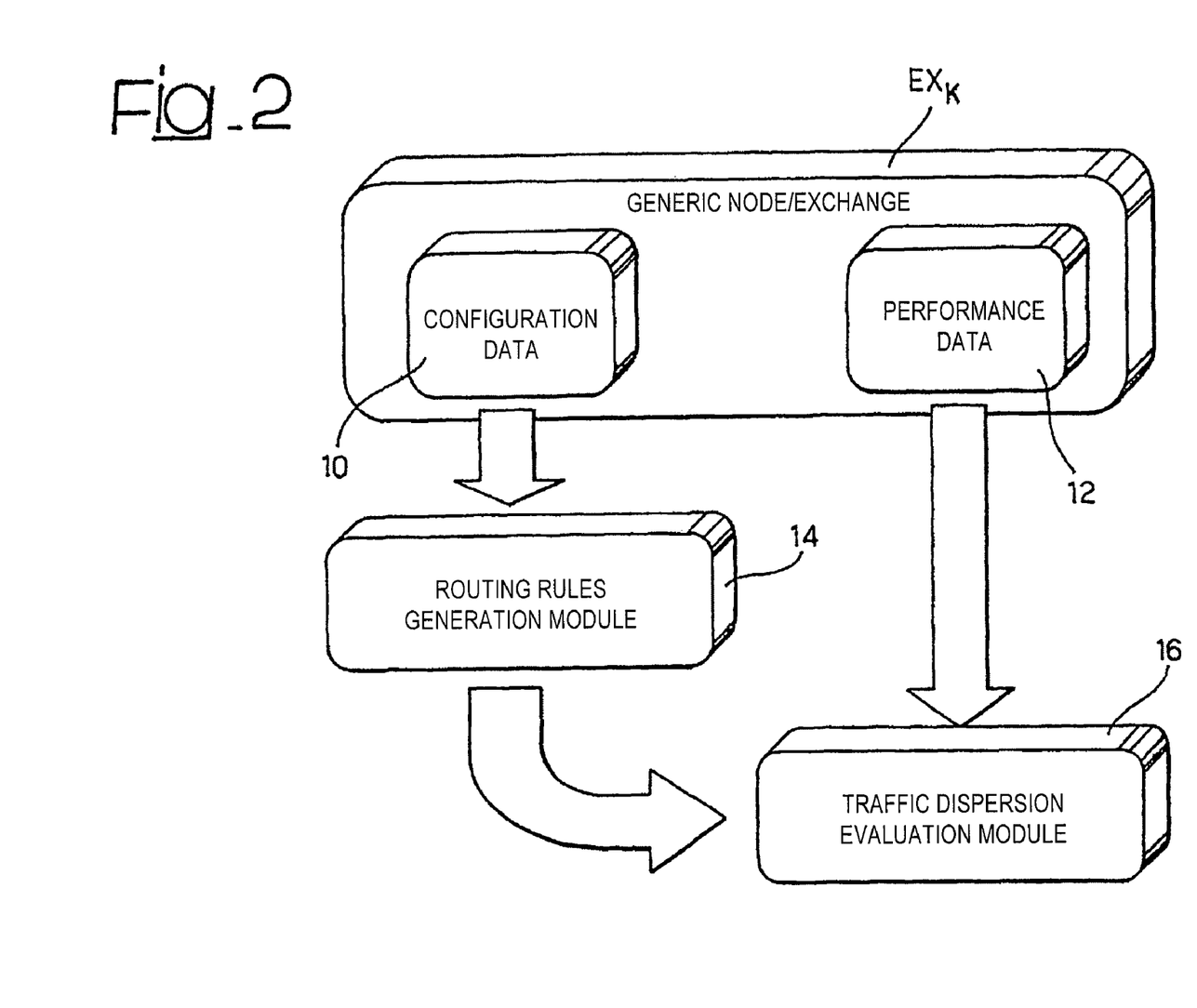
FIG. 2 and 3 are functional block diagrams showing the typical architectural layout of a network node and a system arranged to perform the method disclosed herein.

In FIG. 2, processing modules adapted to perform the functions of configuration data verification and analysis as well as the function of generating the routing rules are designated by the reference numerals 14 and 16. Based on the output from the module 14 and the performance data 12, the module 16 is adapted to provide an evaluation of traffic dispersion data as better detailed in the following.

Even though intended to co-operate with one or more of the exchanges/nodes in the network, these modules can in fact be thoroughly independent entities from the network exchange(s)/node(s): all of the processing tasks described in the following can thus be carried out without producing any additional, undesired workload in the exchange(s)/node(s) in question.

A preferred mode of operation of the arrangement disclosed herein essentially includes two main, sequential phases:

a first phase, wherein the estimated traffic dispersion is evaluated on a "per exchange" basis, i.e. by generating a traffic dispersion estimation independently for each exchange (node) of the telecommunication network, and a second phase, wherein, by collecting in a centralized system the input and output data of the first phase, a more detailed traffic dispersion estimation on a network basis is generated where the traffic towards each destination is further divided depending on the source of the traffic, e.g. the exchange where the traffic originated.

The routing rules generation module 14 analyses the exchange configuration data 10 taken from the exchange $EX_k$. Starting from routing configuration data $CF_k$ during a routing rules generation process RG, the module 14 produces the routing rules $RL_k$ proper. These rules specify, what traffic directed towards a certain destination is distributed over a defined set of circuit groups ("links") and how this distribution is performed.

The module 14 is used only to produce the input data for the traffic dispersion evaluation module 16 and analyse the configuration data 10: hence, it has to be used only when such configuration data change in the telecommunication network.

Figure 3:
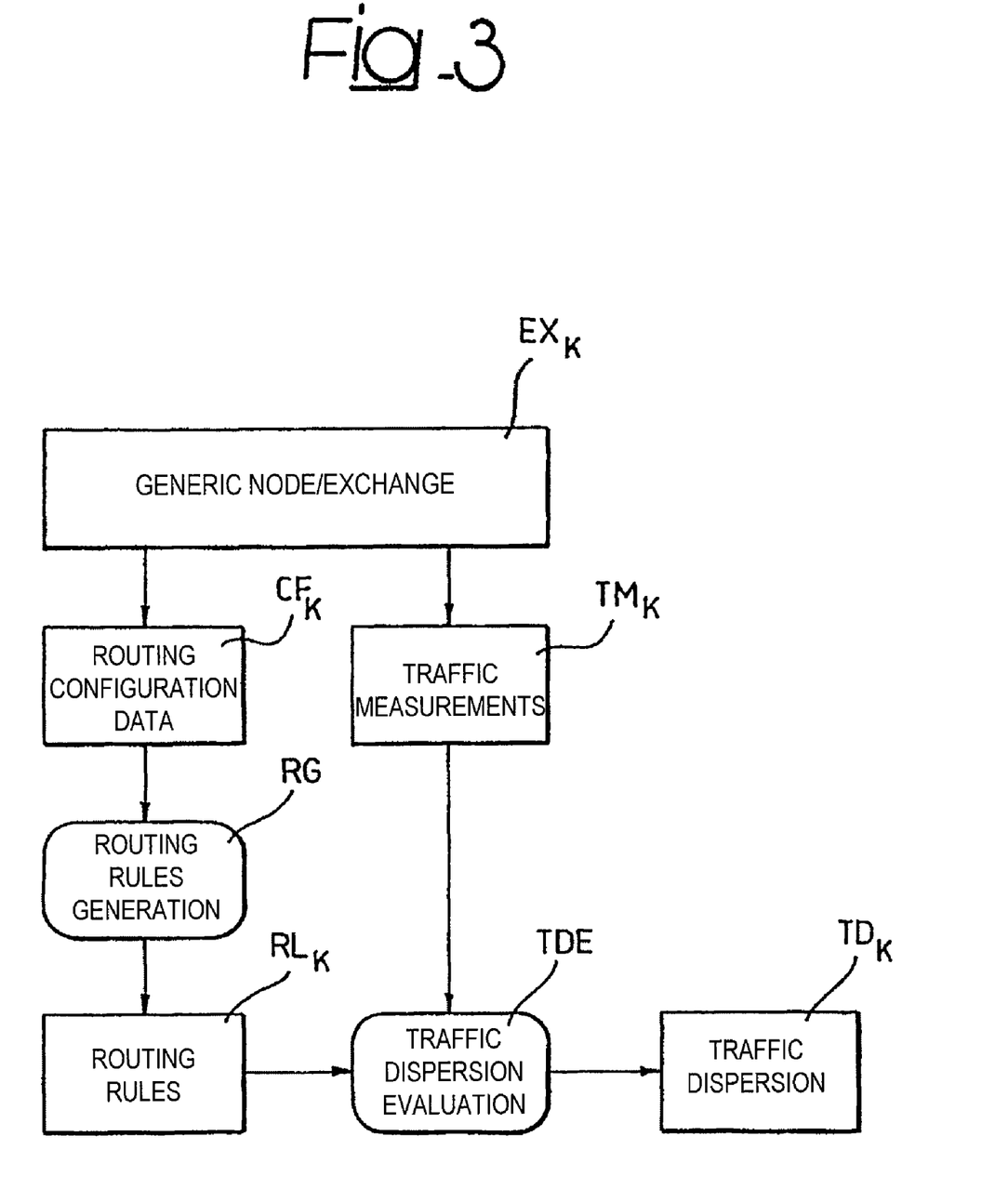

The traffic dispersion evaluation module 16 analyzes two kinds of data, i.e.:

the routing rules $RL_k$ generated from the configuration data 10 by the module 14; and the traffic measurements $TM_k$ on destinations and circuit groups generated by the exchange $EX_k$.

These two kinds of information are used in a traffic dispersion evaluation step TDE to estimate the traffic dispersion. The corresponding information $TD_k$ is conceptually a matrix where rows represent traffic destinations and columns represents circuit groups: each crossing (destination "x", circuit group "y") contains the traffic volume direct towards destination "x" and carried by circuit group "y".

The traffic dispersion evaluation module 16 generates a new instance in the estimated traffic dispersion matrix each time a new set of measurements is available from the exchange $EX_k$ (usually 5, 10 or 15 minutes).

In that respect, it will be appreciated that routing rules are usually fairly stable over time, except when configuration data are changed in the network; this is why the routing rules generation module 14 can be seen as a "preparation" module.

The routing rules generation module 14 analyses the configuration data 10 of the exchange in order to generate for each traffic destination the routing rule. Each routing rule, used by one or more traffic destinations, basically contains the following information:

the set of circuit groups available for traffic routing;

the priority associated to each circuit group when overflow is configured; and the percentage load associated to each circuit group when load sharing is configured.

The routing rules generation module checks if at least one of the following conditions is met:

for each traffic destination there is one and only one routing rule;

for each traffic destination there are two routing rules but one is a subset of the other and the highest priority circuit groups are common to both routing rules: in this case the routing rule containing the "superset" of circuit groups is assumed.

In general, the latter condition is valid for several routing rules where the first rule is a subset of a second one, which in turn is a subset of a third rule and so on, and the highest priority circuit groups are common to all routing rules. In this case, the routing rule containing the superset of circuit groups is assumed.

If none of the above conditions is met, then a modification in the exchange configuration data 10 is carried out in order to modify the traffic destination and/or the relevant routing data.

The traffic dispersion evaluation module 16 performs a statistical evaluation of the traffic dispersion with the following input data:

the set of routing rules used by the exchange to route the traffic towards each destination, as generated by the routing rules generation module 14;

traffic measurements generated by the exchange $EX_k$, namely:

for each destination: traffic volume; and for each circuit group: outgoing traffic volume, outgoing call attempts, outgoing seizures, number of available circuits on the circuit group.

Figure 4:
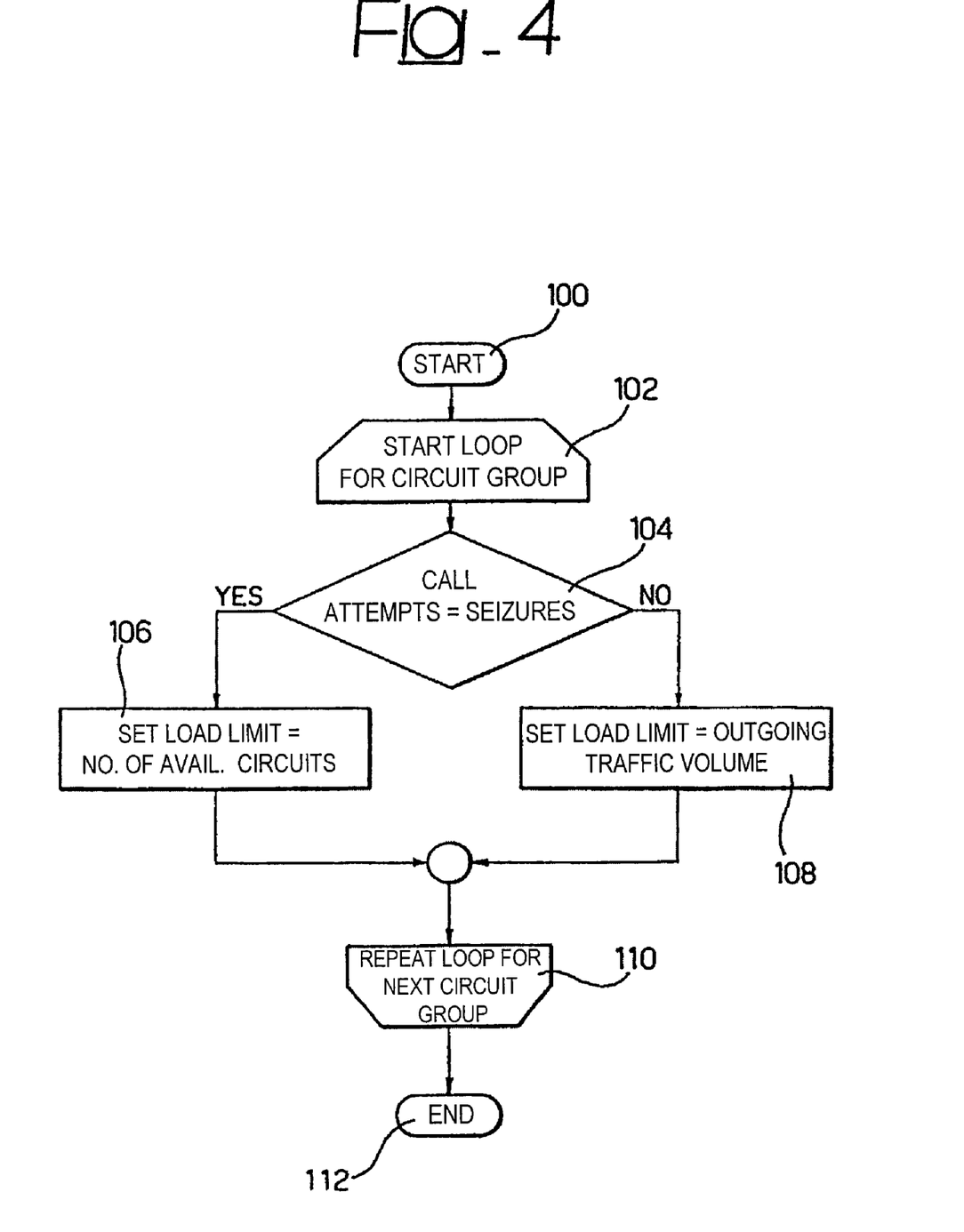
FIGS. 4 to 6 are flowcharts exemplifying certain steps performed in the method disclosed herein.
Figure 5:
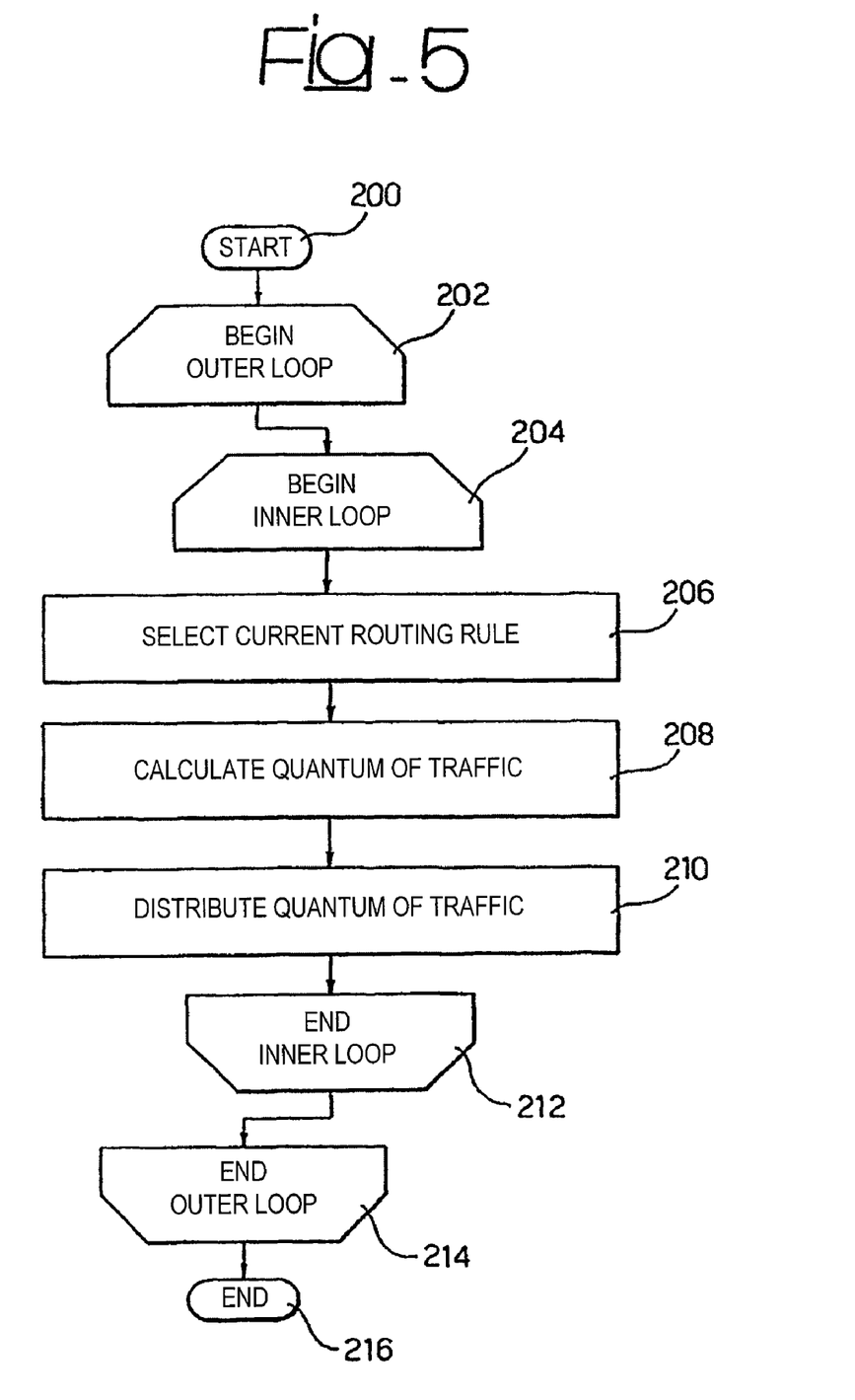
Figure 6:
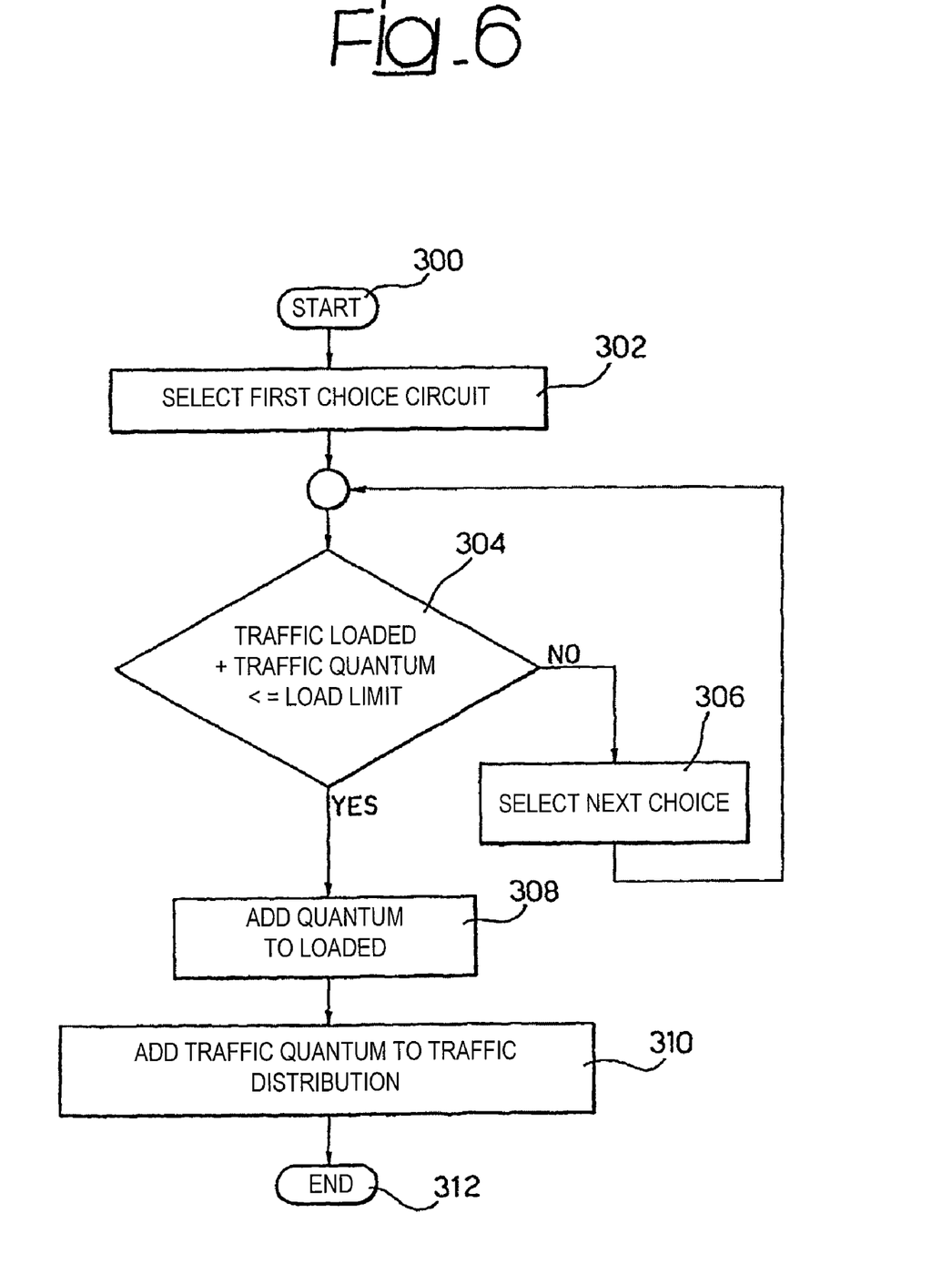

In order to evaluate the estimated traffic dispersion on each circuit group (even in the presence of overflow on one or more circuit group) the method shown in FIGS. 4, 5, and 6 is used.

The method is iterative and, starting from a "start" step 100, is repeated for each circuit group as shown n 102.

The method is based on an incremental load distribution approach: during each loop step, for each traffic destination, a corresponding traffic volume divided by the total number of loop steps is considered; this traffic "quantum" is assigned to the relevant circuit group according to the routing rule associated to the destination.

Overflows on circuit groups are detected in a step 104 by comparing the number of call attempts and the number of seizures.

Hence, for each circuit group there can be two conditions:

the number of call attempts equals the number of seizures (positive outcome of step 104): no overflow has occurred;

the number of call attempts is greater than the number of seizures (negative outcome of step 104): overflow has occurred.

In the former case, in a step 106 the load limit on the current circuit group is set equal to the number of circuits available in the circuit group.

In the latter case, in a step 108 the limit in question is set equal to the outgoing traffic volume measured on the circuit group.

Traffic "quantums" are accepted on the circuit group only if the sum of all the traffic portions assigned to that circuit group is smaller than the outgoing traffic volume measured by the exchange on the same link, i.e. on the same circuit group; otherwise, the next choice in the routing rule is selected and the same is applied to the new circuit group.

In FIG. 4, step 110 indicates the end of the loop started in step 102 while 112 indicates an end step.

The flowcharts of FIGS. 5 and 6 show a traffic dispersion evaluation method adapted to be performed by using the incremental load distribution approach described in the foregoing.

Considering first of all FIG. 5, after a start step 200, two "nested" loops are started in steps 202 and 204, the outer loop being rated to the number of loop steps the method is repeated, while inner loop is repeated for each traffic destination.

In a step 206, the current routing rule used by the exchange to route the current destination is selected. In a subsequent step 208 the "quantum" of traffic is calculated as the ratio of the traffic volume measured for the current destination to the product of the number of loop steps and the load sharing percentage.

In a subsequent step 210 the traffic quantum thus calculated is distributed with the current routing rule as better detailed in the flow chart of FIG. 6. References 212 and 214 represent the ends of the inner loop and the outer loop started at steps 204 and 202, respectively. Reference 216 represents an end phase.

By referring now to the flowchart of FIG. 6, after a start step 300, in a step 302 the first choice circuit group in the current routing rule is selected.

In a subsequent step 304 a comparison is made in order to ascertain whether, for the current circuit group, the sum of the traffic loaded and the traffic quantum is less or equal to the load limit of the current circuit (defined as described with reference to FIG. 4).

In the case of a negative outcome of step 304, in a step 306 the next choice circuit group in the current routing rule is selected, after which the system evolves back upstream of step 304.

In the case of a positive outcome of step 304, in a step 308 the amount of traffic quantum is added to the traffic loaded for the current circuit group and in a step 310 the amount of the traffic quantum is added to the traffic distribution for the current destination and the current circuit group. As in the diagrams of FIGS. 4 and 5, a reference 312 designates an end step.

The traffic dispersion evaluation on a network basis relies on results and assumptions of the traffic dispersion on a "per exchange" basis.

Figure 7:
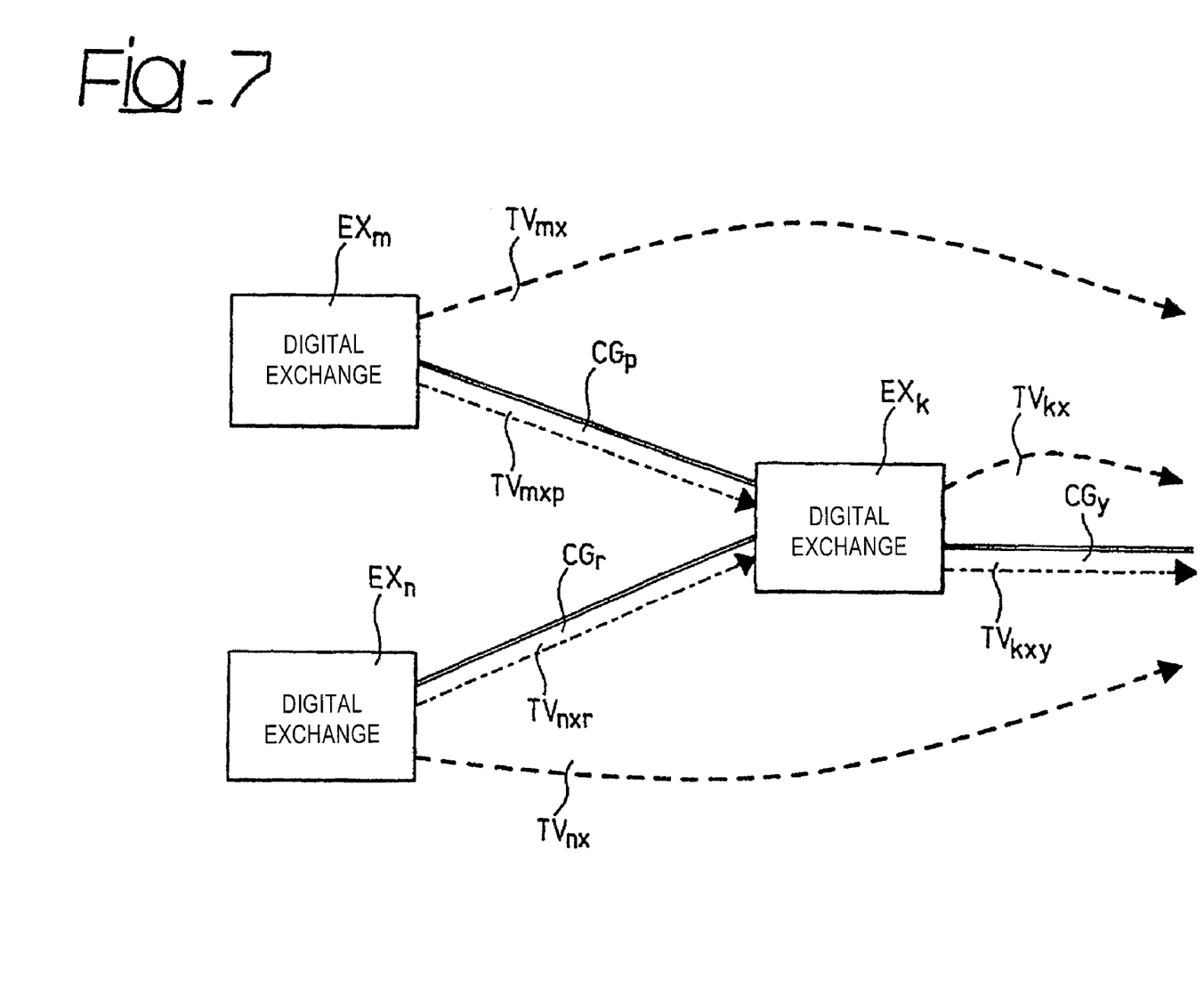
FIG. 7 is a schematic flow diagram exemplifying the meaning of some entities evaluated in the method disclosed herein.

The method adopted for evaluating the traffic dispersion on a network basis can be described by referring to the example shown in FIG. 7.

There, three digital exchanges, namely $EX_k$, $EX_m$ and $EX_n$, are shown with an associated subset of circuit groups:

$CG_p$ interconnecting $EX_m$ and $EX_k$;

$CG_r$ interconnecting $EX_n$ and $EX_k$; and $CG_y$ interconnecting $EX_k$ and another generic exchange.

At each exchange, the traffic volume directed towards the destination "x" is considered, namely:

$TV_{kx}$, i.e. the traffic volume directed towards the destination "x" in the exchange $EX_k$;

$TV_{mx}$, i.e. the traffic volume directed towards the destination "x" in the exchange $EX_m$; and $TV_{nx}$, i.e. the traffic volume directed towards the destination "x" in the exchange $EX_n$;

Once the traffic dispersion evaluation on a per exchange basis is available for the exchanges $EX_k$, $EX_m$ and $EX_n$, the following estimated results can be derived:

$TV_{kxy}$, i.e. the traffic volume directed towards the destination "x" in the exchange $EX_k$, and carried by the circuit group $CG_y$: $TV_{kxy}$ is generally a portion of $TV_{kx}$;

$TV_{mxp}$, i.e. the traffic volume directed towards the destination "x" in the exchange $EX_m$, and carried by the circuit group $CG_p$: $TV_{mxp}$ is generally a portion of $TV_{mx}$; and $TV_{nxr}$, i.e. the traffic volume directed towards the destination "x" in the exchange $EX_n$, and carried by the circuit group $CG_r$: again, $TV_{nxr}$ is generally a portion of $TV_{nx}$.

The traffic volume $TV_{kxy}$ is made up of at least three components:

the traffic volume directed towards destination "x" in exchange $EX_k$, carried out by the circuit group $CG_y$, originating from $EX_k$ itself;

traffic volume directed towards destination "x" in exchange $EX_k$, carried out by the circuit group $CG_y$, incoming from exchange $EX_m$ and carried in by the circuit group $CG_p$; and the traffic volume directed towards destination "x" in exchange $EX_k$, carried out by the circuit group $CG_y$, incoming from $EX_n$ and carried in by the circuit group $CG_r$.

The traffic volume $TV_{kxy}$, which is the result of the traffic dispersion evaluation on the exchange $EX_k$, can be further decomposed using the results and information from the traffic dispersion on each of the exchanges $EX_m$ and $EX_n$, and the relevant circuit groups interconnecting each couple of exchanges.

The evaluation of traffic dispersion on a network basis is done for each exchange with the following method.

The traffic volume towards each destination is considered (e.g. $TV_{kx}$). For each destination the various traffic volume components incoming from the various circuit groups are considered:

$TV_{mxp}$ incoming from $EX_m$;

$TV_{nxr}$ incoming from $EX_n$; and the traffic component originating in $EX_k$, namely, $TV_{kxk}$ that can be obtained as the difference:

$$TV_{kxk} = TV_{kx} - (TV_{mxp} + TV_{nxr})$$

These components have the same routing rule in the exchange or some of them have a subset of the routing rule. Under this condition two groups of traffic components are created, namely:

a first group A, including traffic components using the subset of circuit groups in the routing rule;

a second group B including traffic components using the whole set of circuit groups in the routing rule.

The traffic components of group A are spread on a subset of circuit groups with respect to those of group B; hence they are considered first in the following algorithm.

In general, if there are more than two routing rules for a generic traffic volume, like $TV_{kxy}$, each one included in another, there will be more than two groups of traffic components. The algorithm will consider each group of traffic components starting from the group which is routed by means of the smallest set of circuit groups.

Specifically, the following example will be considered with reference to the exchange $EX_k$.

Consider the traffic volume $TV_{kxy}$ directed towards the destination x and carried by the circuit group $CG_y$; the routing rules used for the three traffic components lead to the following groups:

Group $A = TV_{mxp}$;
Group $B = TV_{nxr}$ and $TV_{kxk}$.

Then the component of traffic volume $TV_{kxy}$ coming from $EX_m$, namely $TV_{kxy,m}$ can be obtained as:

$$TV_{kxy,m} = \frac{TV_{mxp} \times TV_{kxy}}{\sum_{\delta}^{\forall CG \in \Delta} TV_{kx\delta}}$$

where $\Delta$ is the subset of circuit groups used by the current routing rule.

The sum of all the results obtained as before on each circuit group of the routing rule and related to traffic components in group A ($TV_{kxy,A}$) is then calculated and used in the following steps:

$$TV_{kxy,A} = \sum_{\alpha}^{\forall \alpha \in A} TV_{kxy,\alpha}$$

The components related to group B may then be calculated; for example the component of traffic volume $TV_{kxy}$ coming from $EX_n$, namely $TV_{kxy,n}$:

$$TV_{kxy,n} = \frac{TV_{nxr} \times (TV_{kxy} - TV_{kxy,A})}{\sum_{\delta}^{\forall CG \in \Phi} (TV_{kx\delta} - TV_{kx\delta,A})}$$

where $\Phi$ is the whole set of circuit groups used by the current routing rule.

Figure 8:
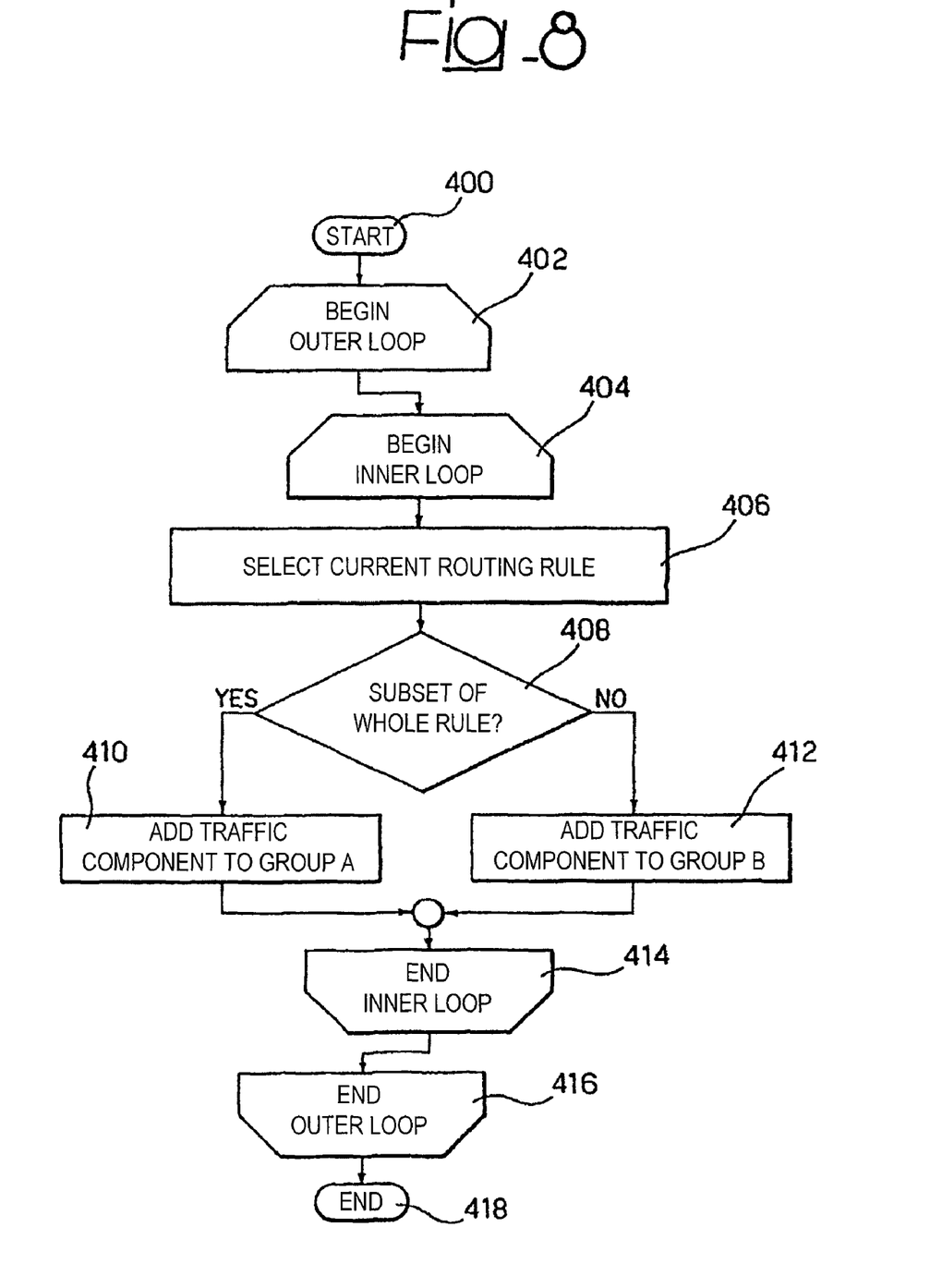
FIGS. 8 and 9 are further flowcharts exemplifying further steps performed in the method disclosed herein.
Figure 9:
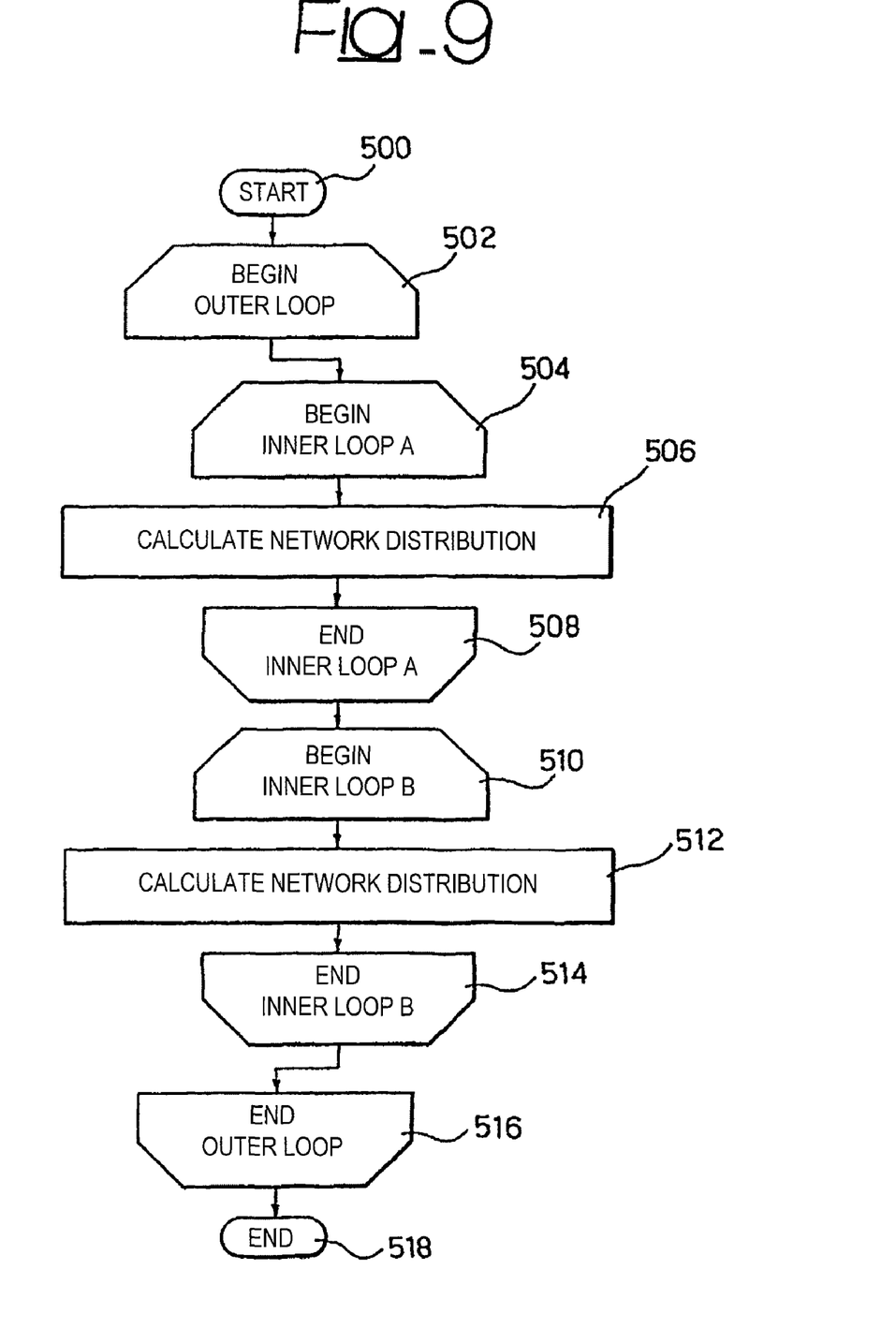

A flowchart of the method described is shown in FIGS. 8 and 9.

Specifically, in FIG. 8, after a start step 400, two nested loops are again started at the steps 402 and 404. Specifically, the outer loop is repeated for each traffic destination, while the inner loop is repeated for each incoming traffic component.

In a step 406 the current routing rule is selected as used by the exchange considered to route the current traffic component.

In a subsequent step 408 a check is made as to whether the current routing rule is a subset of the whole rule used for the traffic dispersion evaluation.

If step 408 yields a positive outcome, the current traffic component is added to the group A in a step 410.

If the step 408 yields a negative result, the current traffic component is added to group B in a step 412.

Steps 414 and 416 designate the ends of the inner loop and outer loop started at steps 404 and 402, respectively. Again, step 418 marks the end of the process.

In the flowchart of FIG. 9, after a start step 500, a step 502 indicates the start of a loop to be repeated for each traffic destination, while in a step 504 another loop is started to be repeated for each incoming traffic component allotted to group A.

In a step 506 a network distribution for the current traffic component and the associated routing rule is calculated.

Step 508 marks the end of the loop started at step 504, while in a subsequent step 510 another loop is started to be repeated for each incoming traffic components in group B.

In a step 512 the network distribution for the current traffic component and the associated routing rule is calculated.

Step 514 marks the end of the loop started at step 510.

Step designated 516 marks the end of the loop started at step 502. Again, a step 518 marks the end of the process.

This approach can be extended insofar as needed in order to decompose traffic volumes keeping into account other exchanges in addition to the exchange located immediately "upstream" in the traffic flow path.

The selection of a centralised architecture for the system just described is advantageous in order to guarantee the availability at the same location of all the information required, i.e.:

the traffic dispersion evaluation on a "per exchange" basis for all the exchanges of interest;

the network architecture in terms of exchanges and circuit groups; and the routing rules, as described in the traffic dispersion evaluation on a "per exchange" basis.

The evaluation of the traffic dispersion on a network basis is applicable when the exchange traffic dispersion has been evaluated on at least two exchanges connected to each other by means of a circuit group.

Of course, without prejudice to the underlying principles of the invention, the details and embodiments may vary, even significantly, with respect to what has been described by way of example only, without departing from the scope of the invention as defined in the claims that follow.

The invention claimed is:

1. A method for evaluating traffic dispersion associated with at least one exchange in a communications network, the exchange being arranged for applying a set of routing rules for selectively allotting incoming traffic directed toward a given destination to a plurality of links, comprising:

incrementally generating traffic quantums representative of said traffic at an evaluation module independent from a plurality of exchanges and nodes of the communications network, based on receiving, at the evaluation module as an input directly from the at least one exchange, a measured traffic volume of said incoming traffic directed towards a given destination;

analyzing, at the evaluation module, said set of routing rules generated by the at least one exchange;

measuring, at the evaluation module, the volume of said incoming traffic directed toward said given destination; and producing, at the evaluation module, a distribution of said traffic quantums over said links in said plurality, the distribution thus obtained being statistically representative of the dispersion of said incoming traffic over said plurality of links at said exchange.

2. The method of claim 1, comprising:

generating said traffic quantums by subdividing said measured traffic volume by a given number of loop steps.

3. The method of claim 1, wherein said incrementally generating traffic quantums representative of said traffic and producing a distribution of said traffic quantums are performed in the absence of interference with operation of said communications network.

4. A method for evaluating traffic dispersion associated with at least one exchange in a communications network, the exchange being arranged for applying a set of routing rules for selectively allotting incoming traffic directed toward a given destination to a plurality of links, comprising:

incrementally generating traffic quantums representative of said traffic at an evaluation module independent from a plurality of exchanges and nodes of the communications network, based on receiving a measured traffic volume of said incoming traffic directed towards a given destination as an input directly from the at least one exchange;

producing, at the evaluation module, a distribution of said traffic quantums over said links in said plurality according to said set of routing rules, the distribution thus obtained being statistically representative of the dispersion of said incoming traffic over said plurality of links at said exchange;

determining, for each link in said plurality, a number of call attempts and a corresponding number of seizures;

if said number of call attempts equals said number of seizures, setting a load limit for applying said set of routing rules for said link equal to the number of circuits available in the link; and if said number of call attempts is greater than said respective number of seizures, setting said load limit equal to the outgoing traffic volume measured by the exchange on said link.

5. The method of claim 4, comprising:

accepting said traffic quantums to be assigned to a given link only if the sum of all the traffic portions assigned to said link is smaller than said load limit set for said link, otherwise selecting a next choice in said set of routing rules.

6. The method of claim 4, comprising:

selecting within said network at least a first exchange receiving traffic from at least a second and a third exchange; and obtaining, based on respective distributions of said quantums of traffic generated at said second and third exchanges, traffic dispersion data indicative of:

the traffic ($TV_{mxp}$) incoming into said first exchange from said second exchange; and the traffic ($TV_{nxr}$) incoming into said first exchange from said third exchange.

7. The method of claim 6, comprising obtaining, based on respective distributions of said quantums of traffic, distribution data representative of the traffic toward a given destination generated at said first exchange different from traffic ($TV_{mxp}$, $TV_{nxr}$) incoming from said second and third exchanges.

8. The method of claim 6, comprising:

partitioning the traffic outgoing from said first exchange based on the respective routing rules into:

a first group, including traffic components coming from said second exchange using a given subset of links in said set of routing rules; and a second group, including traffic components coming from said third exchange using the whole set of links in said set of routing rules.

9. The method of claim 8, comprising:

analysing the traffic volume ($TV_{kxy}$) directed toward a given destination within said network and carried by a respective link coming out of said first exchange; and determining a first component of said traffic volume ($TV_{kxy}$) coming from said second exchange as $$TV_{kxy,m} = \frac{TV_{mxp} \times TV_{kxy}}{\sum_{\delta}^{\forall CG \in \Delta} TV_{kx\delta}}$$

wherein $\Delta$ is the subset of links used by a current routing rule in said first exchange.

10. The method of claim 9, comprising:

analysing the traffic volume ($TV_{kxy}$) directed toward a given destination within said network and carried by a respective link coming out of said first exchange; and determining a first component of said traffic volume (TV$_{kxy}$) coming from said third exchange as $$TV_{kxy,n} = \frac{TV_{nxr} \times (TV_{kxy} - TV_{kxy,A})}{\sum_{\delta}^{\forall CG \in \Phi} (TV_{kx\delta} - TV_{kx\delta,A})}$$

wherein $$TV_{kxy,A} = \sum_{\alpha}^{\forall \alpha \in A} TV_{kxy,\alpha}$$

is the sum of all the results obtained for said second exchange for all the links used by said routing rule and $\Phi$ is the whole set of links used by a current routing rule in said first exchange.

11. A non-transitory computer-readable medium storing instructions for execution by a processing system the instructions comprising software code portions that when executed by the processing system perform the method of any one of claims 1-10.

12. A system for evaluating traffic dispersion in a communications network, comprising:
at least one exchange being arranged for applying a set of routing rules for selectively allotting incoming traffic directed toward a given destination to a plurality of links;
a measuring module interactively coupled to a computer within the system for measuring the volume of said incoming traffic directed toward said given destination;
an evaluation module interactively coupled to the computer within the system and independent from the at least one exchange and nodes of the communications network, wherein the evaluation module
incrementally generates traffic quantums representative of said traffic, based on receiving, at the evaluation module as an input directly from the at least one exchange, a measured traffic volume of said incoming traffic directed towards a given destination,
analyzes said set of routing rules generated by the at least one exchange, and
produces a distribution of said traffic quantums over said links in said plurality, the distribution thus obtained being statistically representative of the dispersion of said incoming traffic over said plurality of links at said exchange.

13. The system of claim 12, comprising said evaluation module being configured for generating said traffic quantums by subdividing the traffic volume measured by said measuring module by a given number of loop steps.

14. The system of claim 12, wherein:
the measuring module is configured for determining, for each link in said plurality, a number of call attempts and a corresponding number of seizures, the system further comprising:
a routing rules generating module interactively coupled to the computer within the system for setting a load limit for applying said set of routing rules, said routing rules generating module being configured for:
if said number of call attempts equals said number of seizures, setting a load limit for applying said set of routing rules for said link equal to the number of circuits available in the link, and
if said number of call attempts is greater than said respective number of seizures, setting said load limit equal to the outgoing traffic volume measured by said measuring module on said link.

15. The system of claim 12, comprising a routing rules generating module interactively coupled to the computer within the system configured for:
accepting said traffic quantums to be assigned to a given link only if the sum of all the traffic portions assigned to said link is smaller than said load limit set for said link, otherwise selecting a next choice in said set of routing rules.

16. The system of claim 12, for use in a network comprising at least a first exchange receiving traffic from at least a second and a third exchange, comprising at least one said evaluation module configured for:
obtaining, based on respective distributions of said quantums of traffic generated at said second and third exchanges, traffic dispersion data indicative of:
the traffic (TV$_{mxp}$) incoming into said first exchange from said second exchange; and
the traffic (TV$_{nxr}$) incoming into said first exchange from said third exchange.

17. The system of claim 16, wherein said at least one evaluation module is configured for obtaining, based on respective distributions of said quantums of traffic, distribution data representative of the traffic toward a given destination generated at said first exchange different from traffic (TV$_{mxp}$, TV$_{nxr}$) incoming from said second and third exchanges.

18. The system of claim 16, wherein said evaluation module is configured for:
partitioning the traffic outgoing from said first exchange based on the respective routing rules into:
a first group, including traffic components coming from said second exchange using a given subset of links in said set of routing rules; and
a second group, including traffic components coming from said third exchange using the whole set of links in said set of routing rules.

19. The system of claim 18, wherein said at least one evaluation module is configured for:
analysing the traffic volume (TV$_{kxy}$) directed toward a given destination within said network and carried by a respective link coming out of said first exchange; and
determining a first component of said traffic volume (TV$_{kxy}$) coming from said second exchange as $$TV_{kxy,m} = \frac{TV_{mxp} \times TV_{kxy}}{\sum_{\delta}^{\forall CG \in \Delta} TV_{kx\delta}}$$

wherein $\Delta$ is the subset of links used by a current routing rule in said first exchange.

20. The system of claim 19, wherein said evaluation module is configured for:
analysing the traffic volume (TV$_{kxy}$) directed toward a given destination within said network and carried by a respective link coming out of said first exchange; and determining a first component of said traffic volume ($TV_{kxy}$) coming from said third exchange as $$TV_{kxy,n} = \frac{TV_{nxr} \times (TV_{kxy} - TV_{kxy,A})}{\sum_{\delta}^{\forall CG \in \Phi} (TV_{kx\delta} - TV_{kx\delta,A})}$$

wherein $$TV_{kxy,A} = \sum_{\alpha}^{\forall \alpha \in A} TV_{kxy,\alpha}$$

is the sum of all the results obtained for said second exchange for all the links used by said routing rule and $\Phi$ is the whole set of links used by a current routing rule in said first exchange.

21. The system of claim 12, wherein said evaluation module is configured for performing steps of incrementally generating traffic quantums representative of said traffic and producing a distribution of said traffic quantums in the absence of interference with operation of said communications network.

22. A communication network including a plurality of exchanges, comprising a system according to any one of claims 12-21.

* * * * *